US012618279B2

(12) United States Patent
Kawanobe

(10) Patent No.: US 12,618,279 B2
(45) Date of Patent: May 5, 2026

(54) DOOR OPENING AND CLOSING DEVICE

(71) Applicant: MITSUI KINZOKU ACT CORPORATION, Kanagawa (JP)

(72) Inventor: Osamu Kawanobe, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 0 days.

(21) Appl. No.: 18/784,249

(22) Filed: Jul. 25, 2024

(65) Prior Publication Data

US 2025/0034927 A1 Jan. 30, 2025

(30) Foreign Application Priority Data

Jul. 28, 2023 (JP) ................................ 2023-123158

(51) Int. Cl.

| | |
|---|---|
| ***E05F 15/63*** | (2015.01) |
| ***E05F 3/22*** | (2006.01) |
| ***E05F 15/40*** | (2015.01) |
| ***E05F 15/611*** | (2015.01) |
| ***E05F 15/70*** | (2015.01) |

(52) U.S. Cl.

CPC .............. *E05F 15/63* (2015.01); *E05F 3/224* (2013.01); *E05F 15/40* (2015.01); *E05F 15/611* (2015.01); *E05F 15/70* (2015.01); *E05Y 2400/37* (2024.05); *E05Y 2900/531* (2013.01)

(58) Field of Classification Search

CPC ......... E05F 3/222; E05F 3/224; E05F 15/611; E05F 15/70; E05F 15/40; E05F 15/63; E05F 15/73

See application file for complete search history.

(56) References Cited

U.S. PATENT DOCUMENTS

| | | | | |
|---|---|---|---|---|
| 4,674,230 | A * | 6/1987 | Takeo | E05F 15/47 49/31 |
| 9,650,824 | B2 * | 5/2017 | Sauerwein | E05F 5/00 |
| 9,797,178 | B2 * | 10/2017 | Elie | E05F 15/77 |
| 10,000,961 | B2 * | 6/2018 | Elie | E05F 15/611 |
| 10,151,132 | B2 * | 12/2018 | Elie | B60R 16/033 |
| 10,161,175 | B2 * | 12/2018 | Elie | E05F 15/40 |
| 10,316,568 | B2 * | 6/2019 | Langenberg | E05F 3/22 |
| 10,745,957 | B2 * | 8/2020 | Elie | E05F 15/40 |

(Continued)

FOREIGN PATENT DOCUMENTS

| | | | |
|---|---|---|---|
| JP | 6583685 | B2 | 10/2019 |
| JP | 6681202 | B2 | 4/2020 |

*Primary Examiner* — Justin B Rephann
(74) *Attorney, Agent, or Firm* — Foley & Lardner LLP

(57) ABSTRACT

A door opening and closing device includes a motor which generates drive power for a door in an opening and closing direction of the door, a door position sensor which detects an opening and closing position of the door, and a controller which controls the motor based on the opening and closing position. The motor includes a stator having at least three-phase coils and a rotor. The motor generates the drive power when the rotor rotates with respect to the stator. The controller performs door holding control of generating, as the drive power, a holding force for holding the door at the opening and closing position, in a case where the opening and closing position is within a predetermined range. In the door holding control, the controller energizes at least two phases of the motor such that rotation of the rotor is braked to generate the holding force.

7 Claims, 12 Drawing Sheets

(56) References Cited

U.S. PATENT DOCUMENTS

| | | | | |
|---|---|---|---|---|
| 10,844,644 | B2 * | 11/2020 | Langenberg | E05F 3/22 |
| 11,047,163 | B2 * | 6/2021 | Elie | B60R 16/033 |
| 11,831,268 | B2 * | 11/2023 | Krushel | E05F 15/63 |
| 12,049,780 | B2 * | 7/2024 | Fritsch | E05F 15/614 |
| 2012/0029701 | A1 * | 2/2012 | Houser | E05F 15/63 49/358 |
| 2016/0010379 | A1 * | 1/2016 | Sauerwein | E05F 5/00 49/350 |
| 2017/0030127 | A1 * | 2/2017 | Elie | E05F 15/77 |
| 2017/0030135 | A1 * | 2/2017 | Elie | E05F 15/73 |
| 2017/0159344 | A1 * | 6/2017 | Langenberg | H02J 50/001 |
| 2017/0211308 | A1 * | 7/2017 | Kitamura | E05F 15/616 |
| 2017/0247927 | A1 * | 8/2017 | Elie | B60Q 9/00 |
| 2017/0247933 | A1 * | 8/2017 | Elie | G01K 3/005 |
| 2018/0002967 | A1 * | 1/2018 | Elie | E05F 15/77 |
| 2018/0334841 | A1 * | 11/2018 | Langenberg | E05F 15/611 |
| 2019/0071913 | A1 * | 3/2019 | Elie | B60Q 9/00 |
| 2020/0386033 | A1 * | 12/2020 | Battlogg | E05F 15/79 |
| 2021/0254390 | A1 * | 8/2021 | Kuwabara | B60J 5/04 |
| 2022/0149757 | A1 * | 5/2022 | Krushel | E05F 15/63 |
| 2022/0282547 | A1 * | 9/2022 | Fritsch | E05F 15/614 |
| 2023/0160250 | A1 * | 5/2023 | Goodchild | E05F 15/40 49/28 |
| 2025/0163747 | A1 * | 5/2025 | Frello | E05F 15/44 |

* cited by examiner

DOOR OPENING AND CLOSING DEVICE

CROSS-REFERENCE TO RELATED APPLICATIONS

This application is based on and claims priority under 35 USC 119 from Japanese Patent Application No. 2023-123158 filed on Jul. 28, 2023, the entire content of which is incorporated herein by reference.

TECHNICAL FIELD

The present disclosure relates to a door opening and closing device.

BACKGROUND ART

For example, there is a door check device that includes an arm whose one end portion is rotatably attached to a body and whose thickness in a rotation center axis direction changes over a longitudinal direction to form a locking recess, and a check mechanism that is provided on a door and is removable from the locking recess of the arm (for example, see JP6681202B).

Further, there is a door opening and closing device for opening and closing a side door supported on a side surface of a vehicle body via a hinge as a technique, the door opening and closing device includes a drive unit disposed in an internal space of the side door, and a link mechanism that connects from an output shaft of the drive unit to the vehicle body, the link mechanism includes a drive arm extending in a radial direction from an output shaft of the drive unit and a driven arm rotatably connected to the vehicle body, and when the drive unit is driven, the side door is opened or closed with respect to the vehicle body via the drive arm and the driven arm (for example, see JP6583685B).

However, in the related art described above, a case where a motor generating drive power for a door in an opening and closing direction of the door is used to hold the door at a predetermined opening and closing position has not been sufficiently studied.

SUMMARY OF INVENTION

The present disclosure provides a door opening and closing device that is capable of using a motor, which generates drive power for a door in an opening and closing direction of the door, to hold the door at a predetermined opening and closing position.

An aspect of the present disclosure relates to a door opening and closing device, including:

- a motor configured to generate drive power for a door in an opening and closing direction of the door;
- a door position sensor configured to detect an opening and closing position of the door; and
- a controller configured to control the motor based on the opening and closing position detected by the door position sensor,
- in which the motor includes a stator having at least three-phase coils and a rotor provided to be rotatable with respect to the stator, and generates the drive power when the rotor rotates with respect to the stator,
- the controller performs door holding control of generating, as the drive power, a holding force for holding the door at the opening and closing position, in a case where the opening and closing position is within a predetermined range, and
- in the door holding control, the controller energizes at least two phases of the motor such that rotation of the rotor is braked to generate the holding force.

According to the aspect of the present disclosure, it is possible to provide a door opening and closing device that is capable of using the motor which generates the drive power for the door in the opening and closing direction of the door, to hold the door at a predetermined opening and closing position.

BRIEF DESCRIPTION OF DRAWINGS

Exemplary embodiment(s) of the present invention will be described in detail based on the following figures, wherein:

FIG. 8A is an enlarged plan view in a state in which the side door is closed, FIG. 8B is an enlarged plan view in a state in which the side door is half-opened, and FIG. 8C is an enlarged plan view in a state in which the side door is opened;

DESCRIPTION OF EMBODIMENTS

Hereinafter, an embodiment of a door opening and closing device according to the present disclosure will be described in detail with reference to the drawings. Hereinafter, an example of a case where the door opening and closing device according to the present disclosure is applied to a vehicle such as an automobile will be described. The drawings are to be viewed in directions of reference signs. Further, the following embodiment does not limit the invention described in the scope of claims, and all combinations of features described in the embodiment are not absolutely necessary for the invention. Two or more of the features described in the embodiment may be freely combined. Hereinafter, the same or similar elements are denoted with the same or similar reference signs, and descriptions thereof may be omitted or simplified as appropriate.

An Example of Vehicle to which Door Opening and Closing Device is Applied

Figure 1:
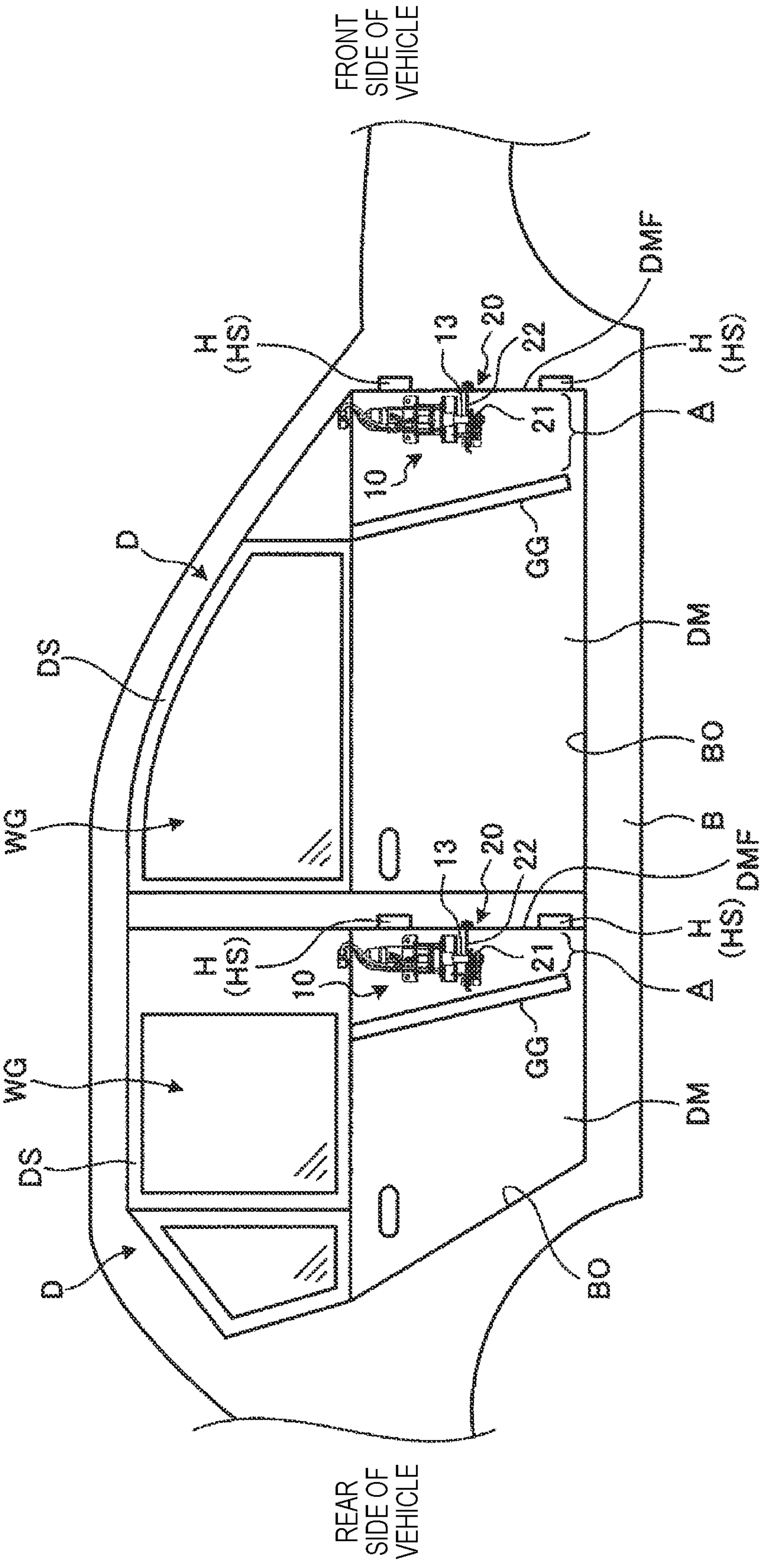
FIG. 1 is a diagram schematically illustrating essential parts of a vehicle to which a door opening and closing device according to an embodiment is applied.

FIG. 1 is a diagram schematically illustrating essential parts of a vehicle to which a door opening and closing device according to the present embodiment is applied. The vehicle to which the door opening and closing device according to the present embodiment is applied (hereinafter, also simply referred to as the "vehicle") is, for example, a four-wheeled vehicle of a four-door type in which a front side door D and a rear side door D are provided on both side surfaces of a vehicle body B.

Each of the front side door D and the rear side door D includes a hollow door body DM and a sash DS provided in a frame shape at an upper portion of the door body DM. Each side door D is connected to the vehicle body B by an upper hinge H and a lower hinge H (hereinafter, collectively referred to as the "hinges H") provided on a front surface DMF of the door body DM, and is capable of rotating around hinge shafts HS along an up-down direction and opening or closing a boarding opening BO of the vehicle body B.

As illustrated in FIG. 1, a window glass WG is disposed on the sash DS of the side door D. The window glass WG is disposed to be movable in the up-down direction along an elevation guide GG by an elevation mechanism (not shown) disposed inside the door body DM, and is capable of closing an opening of the sash DS when the window glass WG moves upward. When the window glass WG moves downward, the window glass WG can be housed inside the door body DM, and can open the opening of the sash DS.

Figure 3:
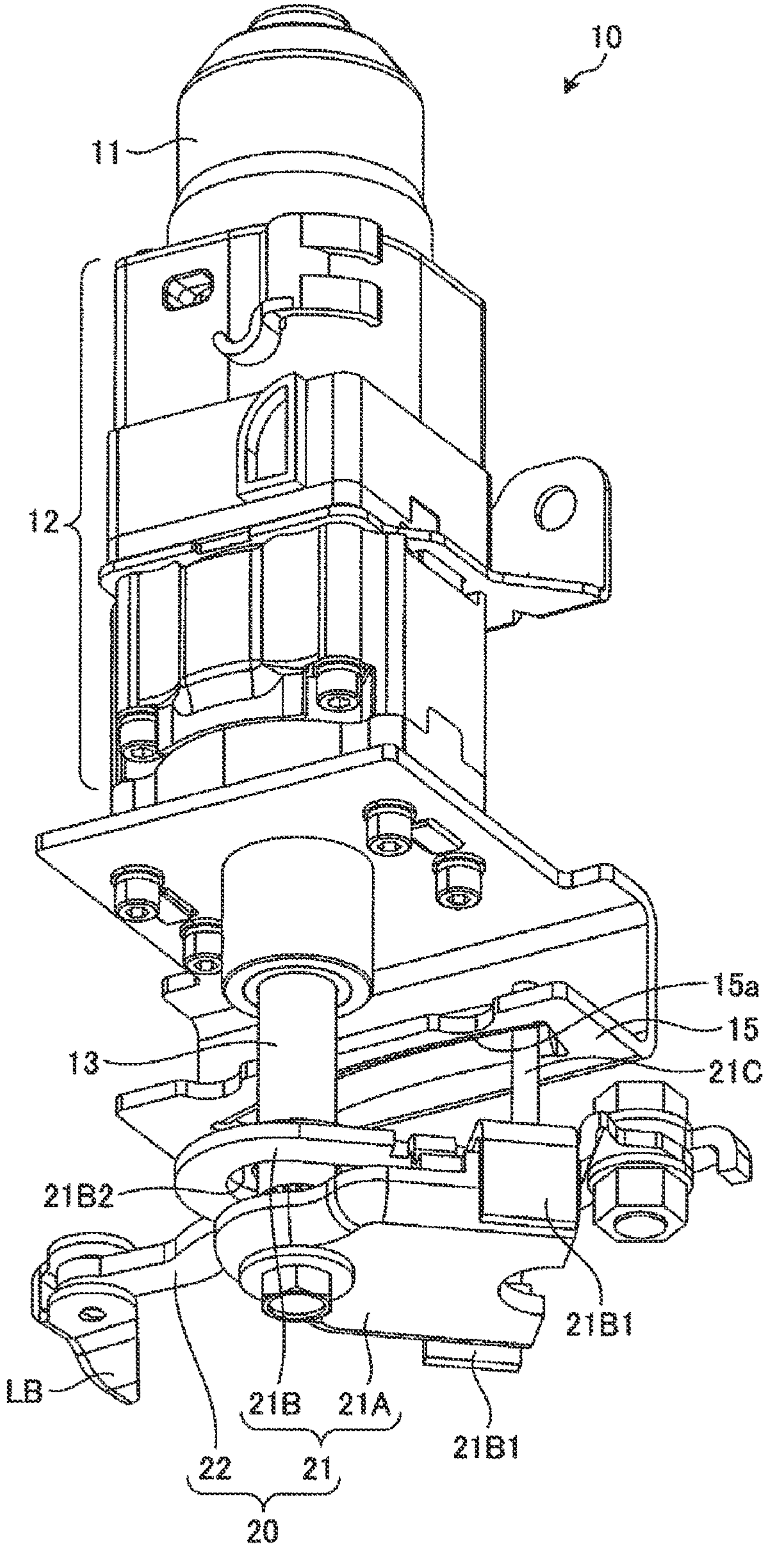
FIG. 3 is an external perspective view of the door opening and closing device to be applied to the vehicle illustrated in FIG. 1 as viewed obliquely downward and outward from the vehicle.
Figure 4:
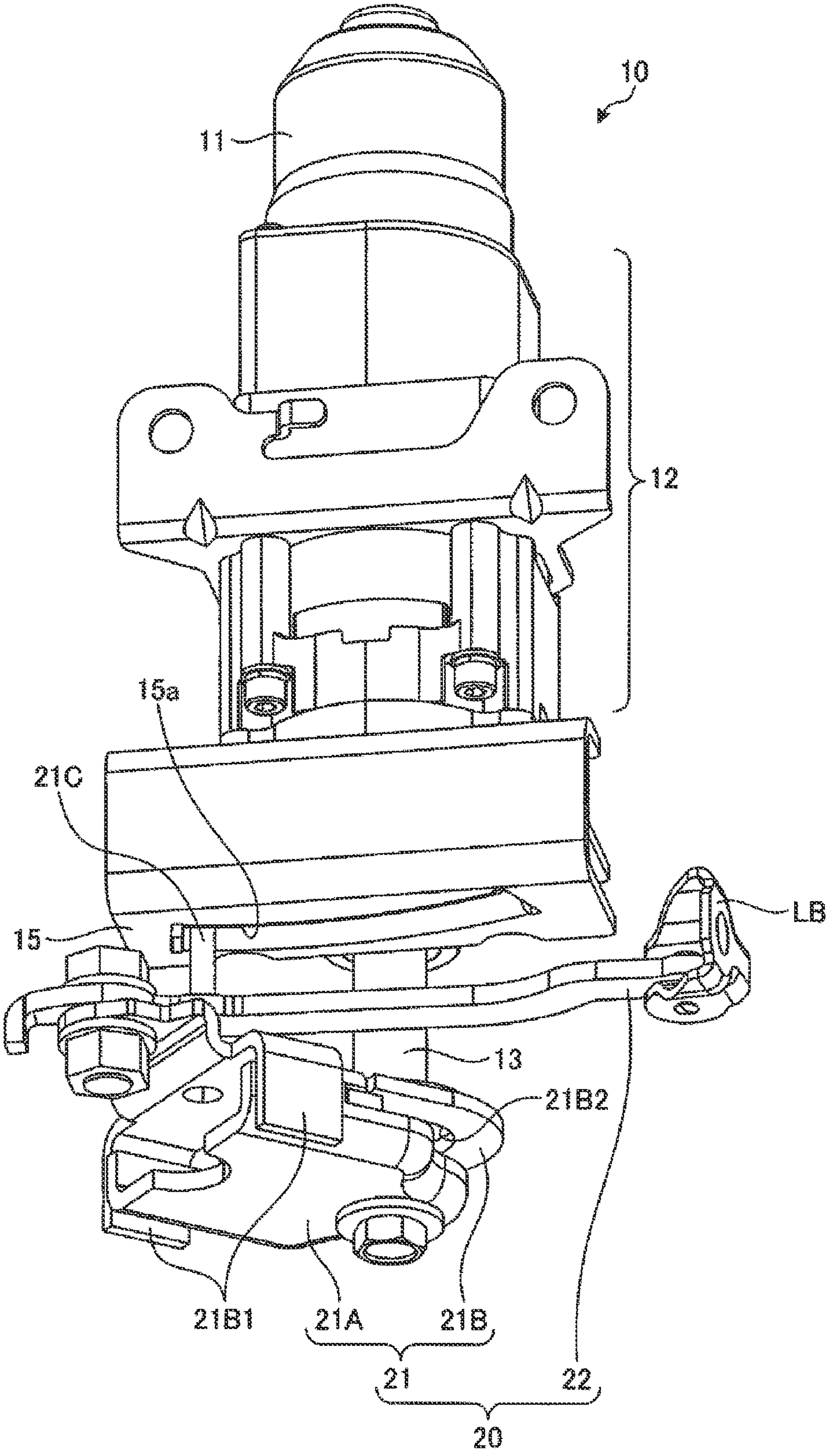
FIG. 4 is an external perspective view of the door opening and closing device to be applied to the vehicle illustrated in FIG. 1 as viewed obliquely downward and inward from the vehicle.
Figure 5:
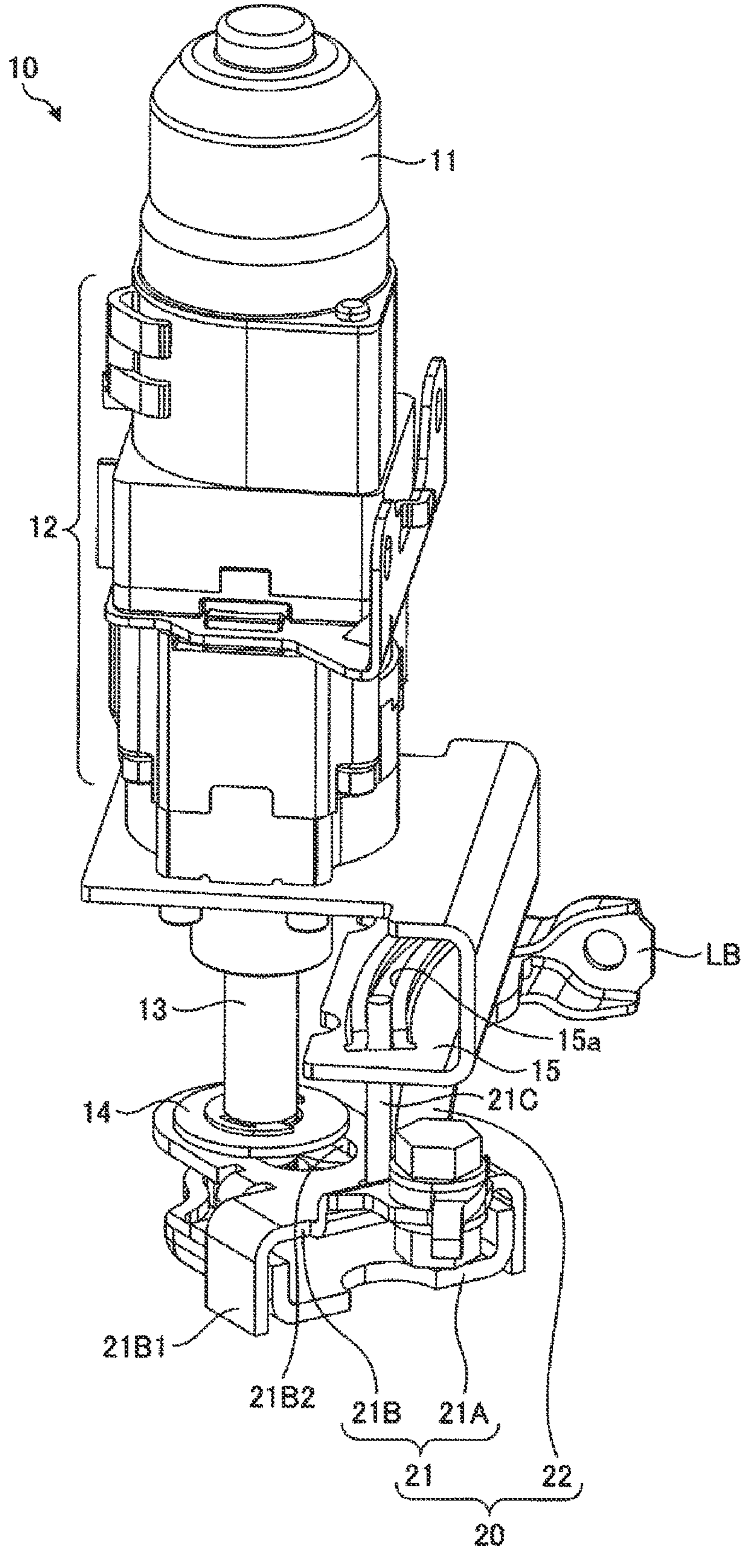
FIG. 5 is an external perspective view of the door opening and closing device to be applied to the vehicle illustrated in FIG. 1 as viewed obliquely upward.
Figure 6:
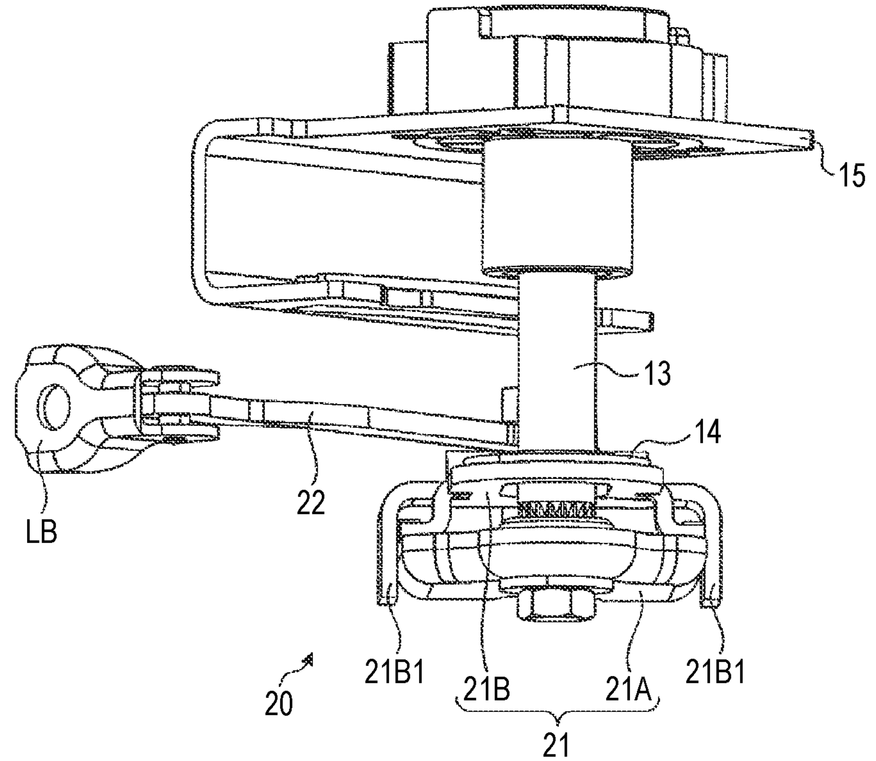
FIG. 6 is an external perspective view of an output shaft and a link mechanism of the door opening and closing device to be applied to the vehicle illustrated in FIG. 1 as viewed from a lateral side.
Figure 7:
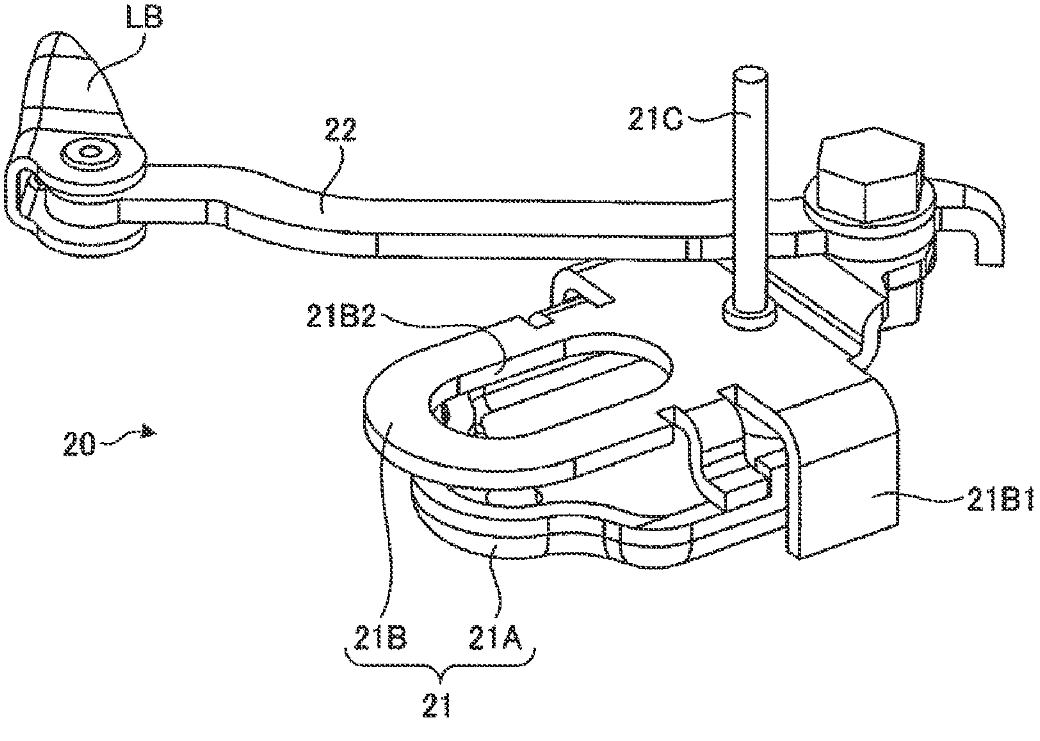
FIG. 7 is an external perspective view of the link mechanism of the door opening and closing device to be applied to the vehicle illustrated in FIG. 1 as viewed obliquely upward.

Further, each side door D is provided with a drive unit 10 inside the door body DM. The drive unit 10 is used to assist in opening and closing of the side door D with respect to the vehicle body B. According to the present embodiment, as illustrated in FIGS. 3 to 5, the drive unit 10 includes an electric motor 11 serving as a drive source, a speed reducer 12, and an output shaft 13. Although not illustrated in FIGS. 3 to 5, a member including a plurality of gears such as a planetary gear mechanism may be applied as the speed reducer 12. Further, a clutch mechanism may be interposed between the electric motor 11 and the output shaft 13 to disconnect power transmission from the electric motor 11 when the side door D is manually operated.

Figure 2:
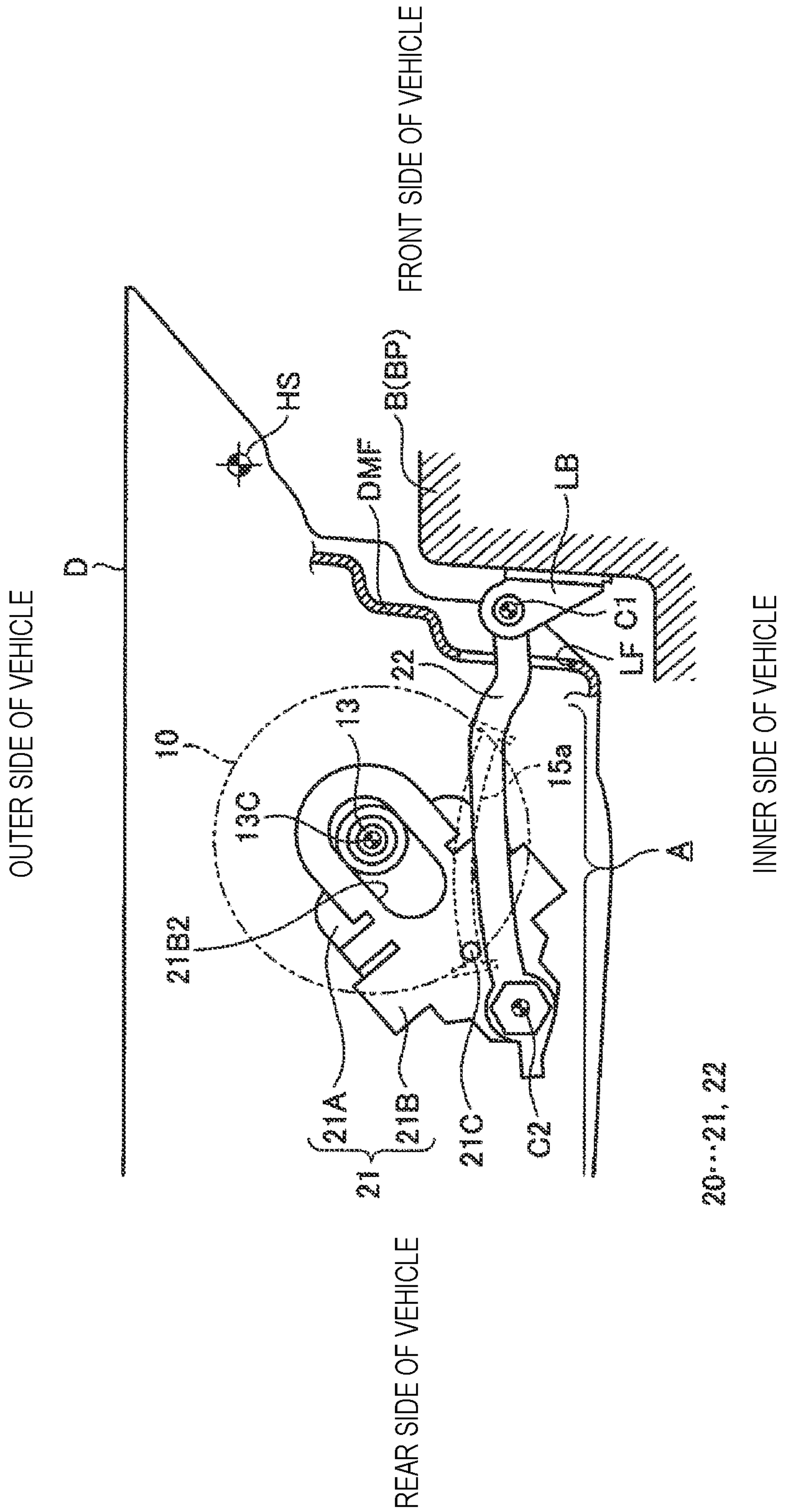
FIG. 2 is an enlarged plan view schematically illustrating a connection portion between a side door and a vehicle body of the vehicle illustrated in FIG. 1.

Regarding the vehicle, as illustrated in FIG. 1, the drive unit 10 is attached inside each side door D in a state in which the electric motor 11 is positioned above and the output shaft 13 extends substantially vertically downward. The position at which the drive unit 10 is attached refers to an internal space A between the front surface DMF provided with the hinges H and the elevation guide GG inside the door body DM. More specifically, as illustrated in FIG. 2, in a state in which the side door D is closed, the drive unit 10 is attached inside the side door D in a state in which the output shaft 13 is positioned at a position on an inner side and a rear side of the vehicle with respect to the hinge shafts HS of the side door D. The output shaft 13 of the drive unit 10 is connected to the vehicle body B via a link mechanism 20.

The link mechanism 20 is used to open or close the side door D with respect to the boarding opening BO of the vehicle body B when the output shaft 13 is rotated by driving of the electric motor 11. According to the present embodiment, the link mechanism 20 includes a drive arm 21 fixed to the output shaft 13, and a driven arm 22 connecting a portion of the vehicle body B facing the front surface DMF of the side door D, for example, a pillar BP and the drive arm 21.

As illustrated in FIGS. 3 to 7, the drive arm 21 includes a first arm element 21A and a second arm element 21B connected in a relatively slidable manner along a longitudinal direction. Specifically, guide protrusions 21B1 are provided on both sides of a base end portion of the second arm element 21B, and the first arm element 21A is disposed between these guide protrusions 21B1 to be slidable along the longitudinal direction but not relatively rotatable. Further, a groove 21B2 is formed in a distal end portion of the second arm element 21B along the longitudinal direction. In the drive arm 21, the output shaft 13 is fixed to the base end portion of the first arm element 21A via the groove 21B2 of the second arm element 21B. Although not illustrated in the FIGS. 3 to 7, the first arm element 21A and the output shaft 13 are spline-coupled to each other, and do not relatively rotate around a shaft core 13C of the output shaft 13. The second arm element 21B is sandwiched between the first arm element 21A and a washer 14 fixed to the output shaft 13. Therefore, the first arm element 21A and the second arm element 21B relatively move only along a radial direction with respect to the output shaft 13, and do not relatively move along the shaft core 13C of the output shaft 13.

According to the present embodiment, as illustrated in FIG. 2, a waiting state of the drive arm 21 refers to a state in which a distal end is inclined by approximately 40° on the rear side toward the inner side of the vehicle. When the electric motor 11 is driven from this state, the distal end of the drive arm 21 can pass through the inner side of the vehicle with respect to the output shaft 13, and the distal end can rotate forward toward the inner side of the vehicle to a position at which the distal end is inclined by approximately 25°.

A base end portion of the driven arm 22 is rotatably connected to the pillar BP of the vehicle body B via a link bracket LB. A distal end portion of the driven arm 22 enters the internal space A of the side door D via a notch LF provided on the front surface DMF of the side door D, and is rotatably connected to the base end portion of the second arm element 21B in the drive arm 21. A rotary shaft core C1 of the driven arm 22 and the link bracket LB and a rotary shaft core C2 of the driven arm 22 and the second arm element 21B are set to be substantially parallel to the shaft core 13C of the output shaft 13. As is clear from FIG. 2, in the state in which the side door D is closed, when the drive arm 21 is in the waiting state, the length of the driven arm 22 is set such that the driven arm 22 extends along a front-rear direction of the vehicle.

As illustrated in FIGS. 2 to 7, on the second arm element 21B of the drive arm 21, a position defining pin 21C is provided to protrude from an upper surface on a base end portion side thereof. The position defining pin 21C is a cylindrical member that extends substantially vertically upward from the second arm element 21B, and an extension end portion thereof is inserted into a slide groove 15*a* of a guide plate 15. The guide plate 15 is a thick plate member fixed to a lower portion of the drive unit 10 and extends to be substantially orthogonal to the output shaft 13. As illustrated in FIG. 2, the slide groove 15*a* is provided to extend along the front-rear direction of the vehicle at a position on the inner side of the vehicle with respect to the output shaft 13, and is formed in a curved shape slightly protruding toward the outer side of the vehicle. That is, the slide groove 15*a* provided in the guide plate 15 guides the position defining pin 21C to gradually come close to the output shaft 13 of the drive unit 10 when the drive arm 21 rotates forward from the waiting state and reaches a position at which the distal end is inclined by an approximately right angle from the output shaft 13 toward the inner side of the vehicle. Thereafter, when the drive arm 21 rotates forward from the position at which the distal end is inclined by an approximately right angle with respect to the front-rear direction of the vehicle, the slide groove 15*a* is formed to guide the position defining pin 21C to gradually separate from the output shaft 13 of the drive unit 10.

In the door opening and closing device according to the present embodiment having the configuration described above, as illustrated in FIG. 8A, when the electric motor 11 of the drive unit 10 in the waiting state is driven in the state in which the side door D is closed, the rotation of the output shaft 13 is transmitted to the driven arm 22 via the drive arm 21, and the driven arm 22 is pushed forward. Therefore, for example, when the drive unit 10 is operated in a state in which meshing between a striker (not shown) provided in the vehicle body B and a latch device provided in the side door D is released, as illustrated in FIGS. 8B and 8C, the driven arm 22 sequentially protrudes forward from the front surface DMF of the side door D to the outside, and the side door D is opened around the hinge shafts HS with respect to the vehicle body B.

Figure 8A:
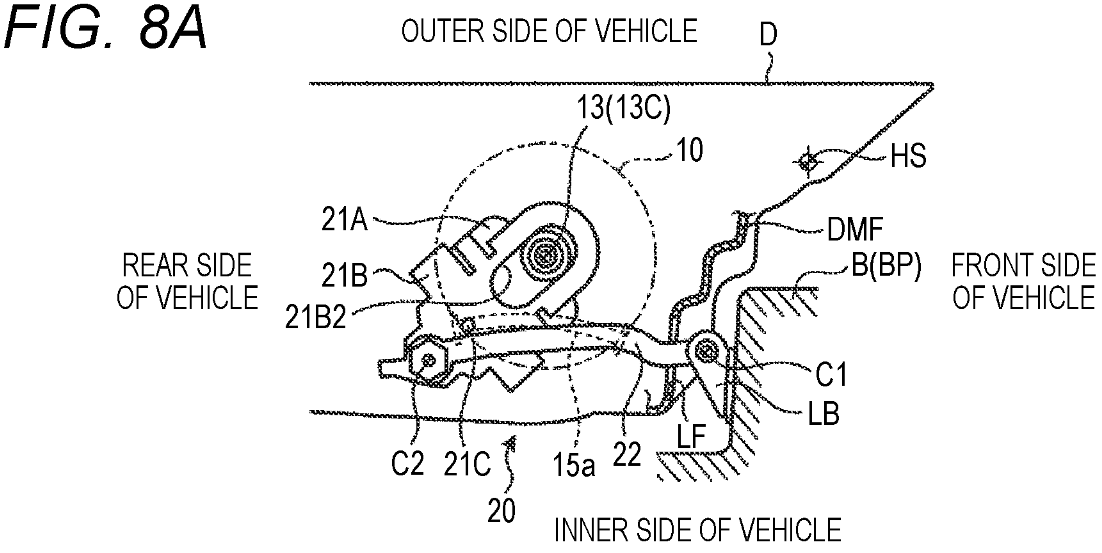
FIGS. 8A to 8C schematically illustrate the connection portion between the side door and the vehicle body of the vehicle illustrated in FIG. 1.
Figure 8B:
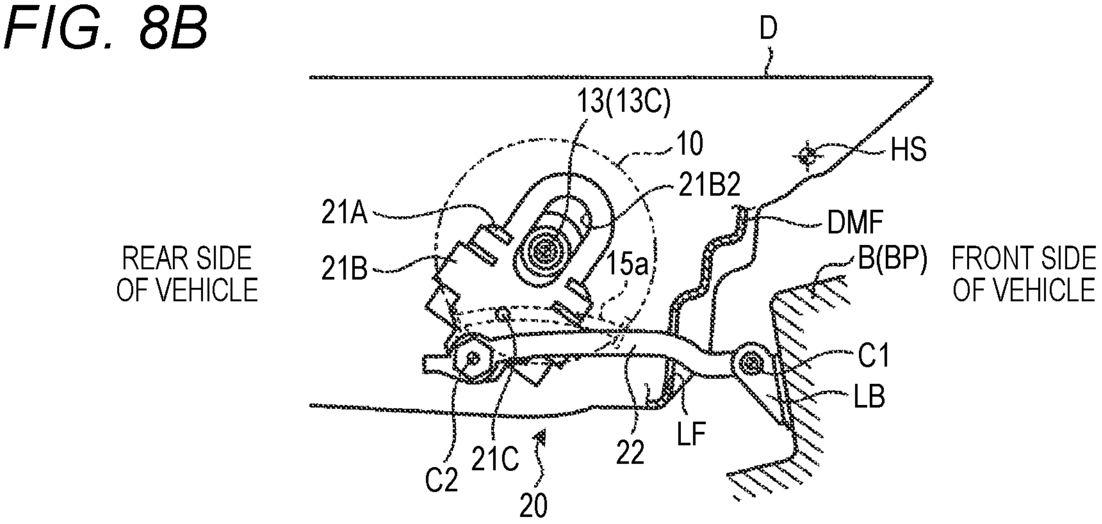
Figure 8C:
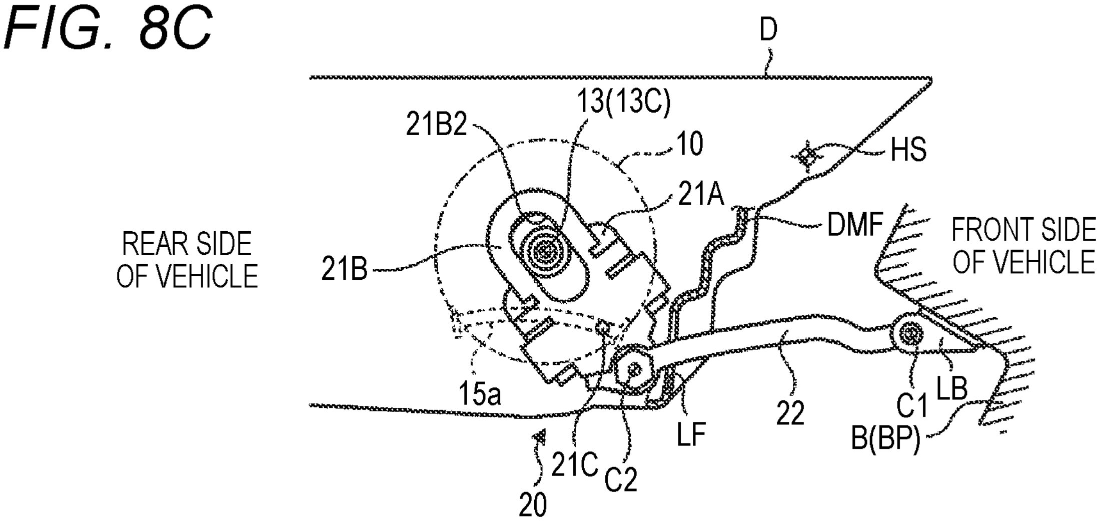

On the other hand, when the electric motor 11 of the drive unit 10 is reversely rotated from a state in which the side door D is opened, as illustrated in FIG. 8B, the driven arm 22 can move rearward from the state illustrated in FIG. 8C to be housed in the internal space A of the side door D, and as illustrated in FIG. 8A, the side door D can be closed with respect to the vehicle body B.

Functional Configuration of Door Opening and Closing Device

Figure 9:
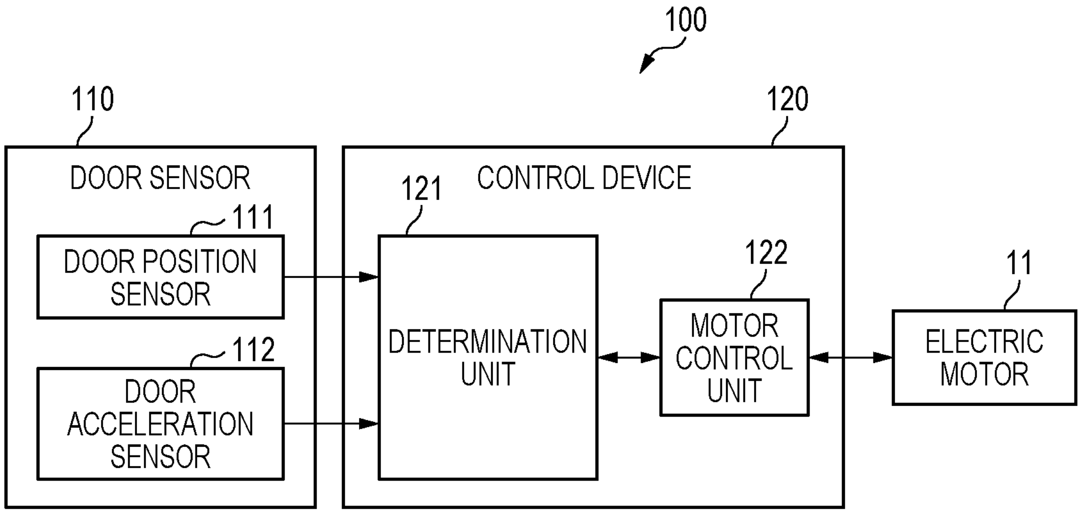
FIG. 9 is a block diagram illustrating an example of a functional configuration of a door opening and closing device 100.

Next, a functional configuration of the door opening and closing device (hereinafter, also referred to as a "door opening and closing device 100") according to the present embodiment will be described. FIG. 9 is a block diagram illustrating an example of the functional configuration of the door opening and closing device 100.

As illustrated in FIG. 9, the door opening and closing device 100 includes the electric motor 11 that generates drive power for the side door D in an opening and closing direction of the side door D, a door sensor 110 that detects the state of the side door D, and a control device (controller) 120 that controls the electric motor 11. Although details will be described later, the electric motor 11 is a three-phase brushless motor in the present embodiment.

The door sensor 110 includes a door position sensor 111 that detects a position of the side door D in the opening and closing direction (hereinafter, also referred to as an "opening and closing position"). According to the present embodiment, it is assumed that the opening and closing position when the side door D is in a full-close state (that is, a state in which the side door D is completely closed) is set to 0 (zero), and a value as the opening and closing position increases as the side door D approaches a full-open state (that is, a state in which the side door D is completely opened). That is, in the present embodiment, the opening and closing position is also referred to as an opening degree of the side door D (hereinafter, also referred to as a "door opening degree").

For example, the door position sensor 111 detects the opening and closing position (that is, the door opening degree) at the current time, and outputs a detection signal indicating a detection result to the control device 120. Instead of the detection signal indicating the opening and closing position at the current time, the door position sensor 111 may output a pulse signal corresponding to opening and closing movement of the side door D to the control device 120, for example. The door position sensor 111 can be implemented by, for example, a rotary encoder.

The door sensor 110 may further include a door acceleration sensor 112 that detects an acceleration of the side door D in the opening and closing direction (hereinafter, also referred to as a "door acceleration"). For example, the door acceleration sensor 112 detects, as the door acceleration, the acceleration at a distal end portion (specifically, the other end portion opposite to one end portion at which the hinges H are provided) of the side door D in the opening and closing direction at the current time, and outputs a detection signal indicating a detection result to the control device 120. The door acceleration sensor 112 can be implemented by, for example, a gyro sensor.

The control device 120 controls the electric motor 11 based on the state of the side door D detected by the door sensor 110. For example, the control device 120 is implemented by a motor drive circuit having half-bridge circuits corresponding to respective phases of the electric motor 11, a microcontroller that controls opening and closing of switching elements (for example, MOSFETs) provided in these half-bridge circuits, and the like. Further, the control device 120 includes, for example, a determination unit 121 and a motor control unit 122 as functional units achieved by executing a program stored in the microcontroller in advance or achieved by the motor drive circuit.

When door holding control to be described later is not performed by the motor control unit 122, the determination unit 121 determines whether an execution condition for the door holding control is satisfied, and sends a determination result to the motor control unit 122. More specifically, the determination unit 121 determines whether the opening and closing position changes to be within a predetermined range based on the opening and closing position (that is, the door opening degree) of the side door D detected by the door position sensor 111. Then, the determination unit 121 determines that the execution condition for the door holding control is satisfied, based on the determination that the opening and closing position changes to be within the predetermined range. In other words, when determining that the opening and closing position is not within the predetermined range, the determination unit 121 determines that the execution condition for the door holding control is not satisfied.

According to the present embodiment, a first range and a second range are provided as the predetermined range, and the determination unit 121 determines whether the opening and closing position changes to be within the first range or within the second range. Here, the first range is a range from "$a-\alpha$" as an example of a first position to "$a+\alpha$" as an example of a second position, and is a range including "a" as an example of a predetermined position. The second range is a range from "b−α" as another example of the first position to "b+α" as another example of the second position, and is a range including "b" as another example of the predetermined position. Here, a can be any value larger than 0 (zero), a can be any value larger than a, and b can be any value larger than a.

When the determination unit 121 determines that the execution condition for the door holding control is satisfied, the motor control unit 122 performs the door holding control such that the electric motor 11 generates, as the drive power described above, a holding force for holding the side door D at the opening and closing position. As described above, according to the present embodiment, when the opening and closing position changes to be within the predetermined range (more specifically, within the first range or within the second range), it can be determined that the execution condition for the door holding control is satisfied. Therefore, the motor control unit 122 can perform the door holding control when the opening and closing position is within the predetermined range. According to the present embodiment, in the door holding control, the motor control unit 122 controls the electric motor 11 in a predetermined two-phase energizing state to generate the holding force.

Figure 10:
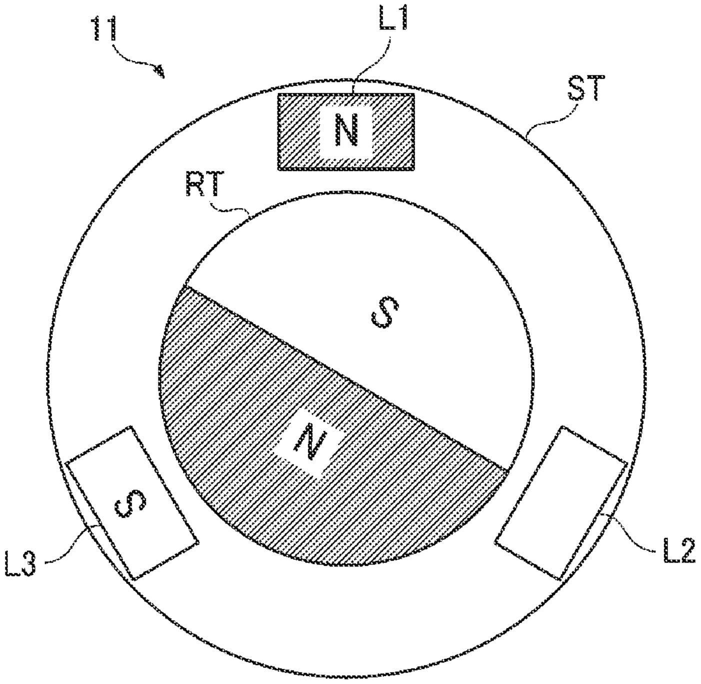
FIG. 10 is a diagram illustrating an example of a two-phase energizing state.

FIG. 10 is a diagram illustrating an example of the two-phase energizing state. As illustrated in FIG. 10, according to the present embodiment, the electric motor 11 is a 3-phase 2-pole 3-slot type brushless motor, and includes a stator ST having three coils L1, L2, and L3 (that is, three-phase coils) independent of each other, and a rotor RT that is provided to be rotatable with respect to the stator ST and has two poles.

The two-phase energizing state refers to a state in which rotation of the rotor RT with respect to the stator ST is braked, and for example, a state in which currents equal in magnitude and in opposite directions flow through two coils (that is, two phases) among the three coils of the stator ST so that no rotating magnetic field is generated. FIG. 10 illustrates a two-phase energizing state in a case where the currents equal in magnitude and in opposite directions flow through the coil L1 and the coil L3. When the electric motor 11 is in such a two-phase energizing state, the rotor RT is maintained in a state of being stopped at a predetermined rotation position with respect to the stator ST, and thus the holding force described above is generated.

However, even when the electric motor 11 is in the two-phase energizing state, if a user of the door opening and closing device 100 (hereinafter, also simply referred to as the "user") inputs an operation force exceeding the holding force according to the two-phase energizing state to the side door D, the opening and closing movement of the side door D is performed by the operation force, and accordingly, the rotor RT can rotate with respect to the stator ST.

When the phases to be energized at the time of the door holding control (that is, when the electric motor 11 is in the two-phase energizing state) are set to be constant, in the case where the rotor RT rotates by the input of the operation force exceeding the holding force according to the two-phase energizing state, the holding force is set to a maximum value next time after the rotor RT rotates by an electrical angle of 360°. Therefore, when the phases to be energized at the time of the door holding control are set to be constant, even when the user operates the side door D by a constant operation force under the door holding control, the movement of the side door D is intermittent, and the operability of the side door D under the door holding control may be reduced.

Therefore, when the door holding control renders the electric motor 11 to be in the two-phase energizing state, the motor control unit 122 preferably energizes the two phases corresponding to the rotation position of the rotor RT with respect to the stator ST at that time.

Figure 11:
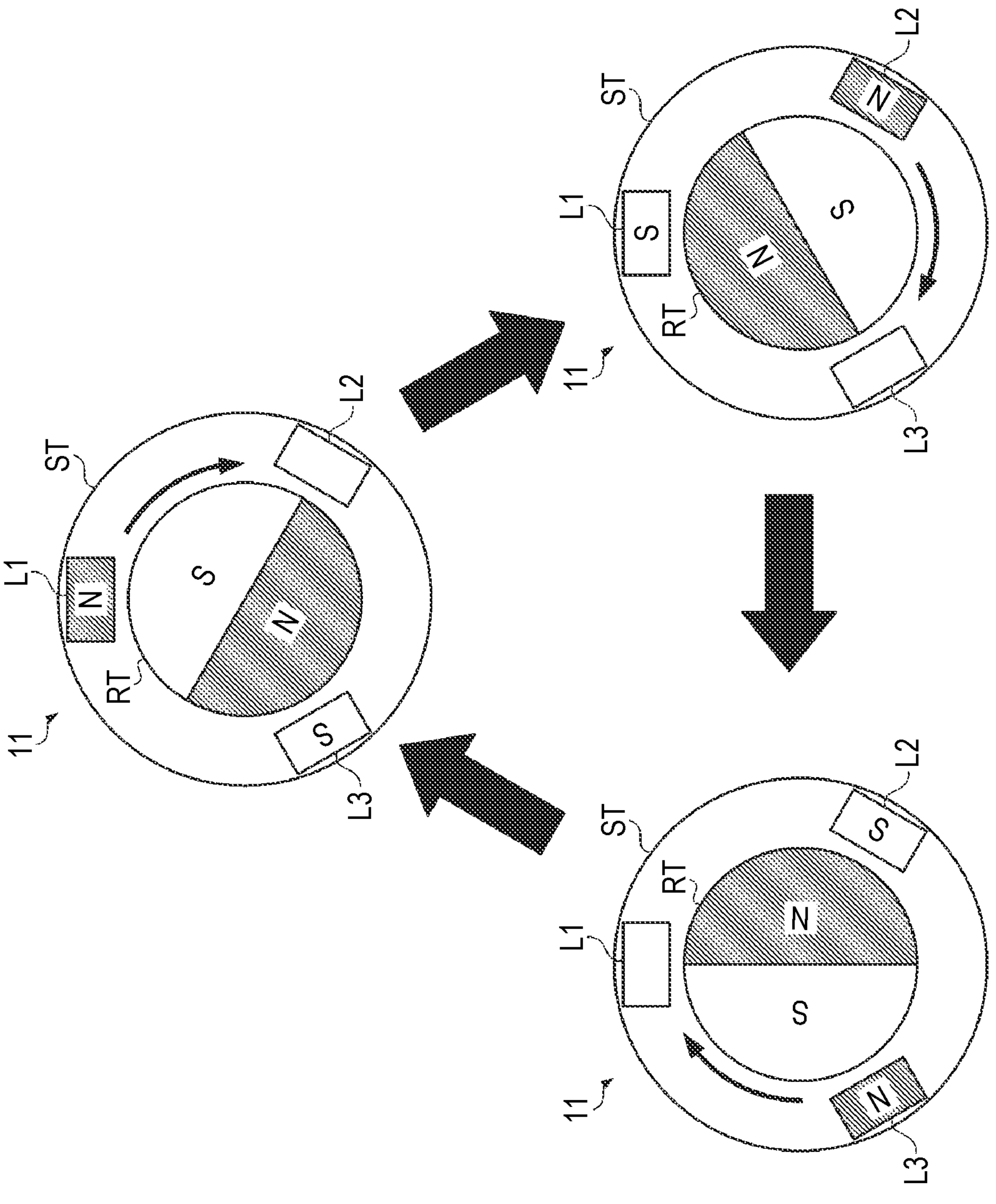
FIG. 11 is a diagram illustrating an example of a relation between phases to be energized by door holding control and a rotation position of a rotor RT.

FIG. 11 is a diagram illustrating an example of a relation between the phases to be energized by the door holding control and the rotation position of the rotor RT. As illustrated in FIG. 11, under the door holding control, when the motor control unit 122 energizes the two phases corresponding to the rotation position of the rotor RT to render the electric motor 11 to be in the two-phase energizing state, for example, the holding force can be set to a maximum value every time the rotor RT rotates by an electrical angle of 120°. Accordingly, an intermittent feeling of the movement of the side door D under the door holding control can be reduced, and the operability of the side door D under the door holding control can be improved.

In such a case, for example, information indicating which phases are energized according to the rotation position of the rotor RT is stored in the control device 120 in advance. Further, when the door holding control renders the electric motor 11 to be in the two-phase energizing state, the motor control unit 122 refers to the information to energize the two phases corresponding to the rotation position of the rotor RT. Further, for example, the electric motor 11 is provided with a position detector (for example, a Hall sensor or an optical encoder) that detects the rotation position of the rotor RT, and the control device 120 (for example, the motor control unit 122) is capable of obtaining the rotation position of the rotor RT based on a detection signal from the position detector.

However, when the user is trying to quickly open or close the side door D, the operation force of the user with respect to the side door D can increase, and the door acceleration can be equal to or larger than a predetermined value. In other words, when the door acceleration is equal to or larger than the predetermined value, there is a high possibility that the user is trying to quickly open or close the side door D. When the holding force is generated in such a case, the opening and closing of the side door D may be inhibited by the holding force.

Therefore, for example, the determination unit 121 may further determine whether the door acceleration is less than the predetermined value based on the door acceleration detected by the door acceleration sensor 112. Then, the determination unit 121 may determine that the execution condition for the door holding control is satisfied based on the determination that the door acceleration is less than the predetermined value and the opening and closing position changes to be within the predetermined range (for example, within the first range or within the second range). In other words, when determining that the door acceleration is equal to or larger than the predetermined value, the determination unit 121 may determine that the execution condition for the door holding control is not satisfied regardless of whether the opening and closing position is within the predetermined range. That is, the motor control unit 122 may perform the door holding control when the door acceleration is less than the predetermined value and the opening and closing position is within the predetermined range, and may not perform the door holding control regardless of the opening and closing position when the door acceleration is equal to or larger than the predetermined value. Therefore, it is possible to prevent the generation of the holding force that can inhibit the opening and closing of the side door D against the intention of the user that the user is trying to quickly open or close the side door D.

Instead of the door acceleration detected by the door acceleration sensor 112, the control device 120 may use the door acceleration obtained by further time-differentiating a speed of the side door D in the opening and closing direction, the speed is obtained by time differentiating the opening and closing position of the side door D detected by the door position sensor 111.

In addition, when the door holding control is performed by the motor control unit 122, the determination unit 121 determines whether a condition for stopping the door holding control is satisfied, and sends a determination result to the motor control unit 122. More specifically, the determination unit 121 determines whether the opening and closing position changes to be outside the predetermined range from within the predetermined range, based on the opening and closing position of the side door D detected by the door position sensor 111. Then, the determination unit 121 determines that the condition for stopping the door holding control is satisfied, based on the determination that the opening and closing position changes to be outside the predetermined range from within the predetermined range.

According to the present embodiment, as described above, the first range and the second range are provided as the predetermined range. Therefore, the determination unit 121 determines whether the opening and closing position changes to be outside the first range from within the first range, or changes to outside the second range from within the second range, under the door holding control. Then, the determination unit 121 determines that the condition for stopping the door holding control is satisfied based on the determination that the opening and closing position changes to be outside the first range from within the first range, or changes to be outside the second range from within the second range.

When the determination unit 121 determines that the condition for stopping the door holding control is satisfied, the motor control unit 122 stops the door holding control. That is, when the opening and closing position changes to be outside the predetermined range from within the predetermined range under the door holding control, the motor control unit 122 stops the door holding control. More specifically, according to the present embodiment, the motor control unit 122 stops the door holding control when the opening and closing position changes to be outside the first range from within the first range, or when the opening and closing position changes to be outside the second range from within the second range, under the door holding control.

Further, for example, when the determination unit 121 determines that the opening and closing position is not within the predetermined range (for example, within the first range or within the second range), the motor control unit 122 may cause an assist force for supplementing (that is, assisting) the opening and closing of the side door D to be generated from the electric motor 11 as the drive power. In this way, the user can open or close the side door D by a small operation force, and convenience for the user is improved.

Examples of Processes Executed by Control Device

Figure 12:
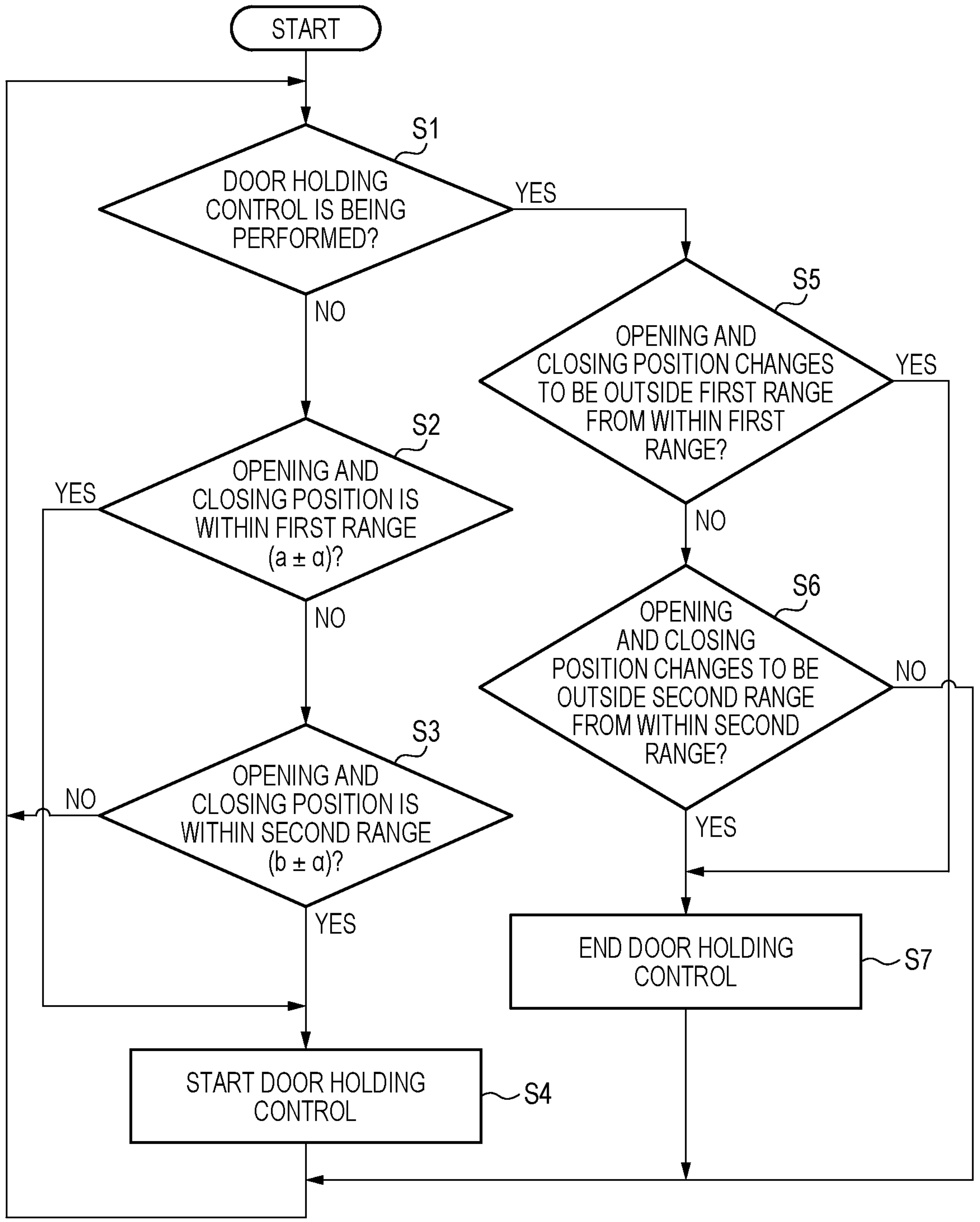
FIG. 12 is a flowchart illustrating examples of processes executed by a control device 120 of the door opening and closing device 100.

FIG. 12 is a flowchart illustrating examples of processes executed by the control device 120 of the door opening and closing device 100. For example, when electric power is supplied from a battery or the like of the vehicle, the control device 120 executes a series of processes illustrated in FIG. 12.

As illustrated in FIG. 12, the control device 120 first determines whether the door holding control is being performed (step S1). When it is determined that the door holding control is not being performed (step S1: NO), the control device 120 determines whether the opening and closing position changes to be within the first range (that is, the range of a±α) (step S2) based on the opening and closing position of the side door D detected by the door position sensor 111.

When it is determined that the opening and closing position changes to be within the first range (step S2: YES), the control device 120 proceeds to the process of step S4. On the other hand, when it is determined that the opening and closing position is not within the first range (step S2: NO), the control device 120 determines whether the opening and closing position changes to be within the second range (that is, the range of b+a) (step S3) based on the opening and closing position of the side door D detected by the door position sensor 111.

When it is determined that the opening and closing position changes to be within the second range (step S3: YES), the control device 120 starts the door holding control (step S4) and returns to the process of step S1. On the other hand, when it is determined that the opening and closing position is not within the second range (step S3: NO), the control device 120 returns to the process of step S1 without starting the door holding control.

Further, when it is determined that the door holding control is being performed by the process of step S1 (step S1: YES), the control device 120 determines whether the opening and closing position changes to be outside the first range from within the first range (step S5), based on the opening and closing position of the side door D detected by the door position sensor 111.

When it is determined that the opening and closing position changes to be outside the first range from within the first range to (step S5: YES), the control device 120 proceeds to the process of step S7. On the other hand, when it is not determined that the opening and closing position changes to be outside the first range from within the first range (step S5: NO), the control device 120 determines whether the opening and closing position changes to be outside the second range from within the second range (step S6), based on the opening and closing position of the side door D detected by the door position sensor 111.

When it is determined that the opening and closing position changes to be outside the second range from within the second range (step S6: YES), the control device 120 stops the door holding control (step S7) and returns to the process of step S1. On the other hand, when it is not determined that the opening and closing position changes to be outside the second range from within the second range (step S6: NO), the control device 120 returns to the process of step S1 without ending the door holding control.

As described above, according to the door opening and closing device 100, when the opening and closing position of the side door D changes to be within the predetermined range, the holding force is generated from the electric motor 11, and the side door D is held by the holding force. Accordingly, the side door D can be held at a predetermined opening and closing position (for example, a half-open position between a full-close position and a full-open position) by using the electric motor 11. Therefore, for example, even when the vehicle is not provided with a check link (also referred to as a door checker) in the related art separately from the electric motor 11, it is possible to hold the side door D at the predetermined opening and closing position and to prevent the opening and closing movement of the side door D against the intention of the user. In other words, even when the vehicle is not provided with the check link in the related art, it is possible to provide the user with the same (or similar) operational feeling as that in a case where the vehicle is provided with the check link in the related art when the side door D is opened or closed. Accordingly, it is possible to prevent an increase in the number of parts of the vehicle while improving the convenience for the user as compared with the case where the check link in the related art is also provided in the vehicle in addition to the electric motor 11.

Further, according to the door opening and closing device 100, when the opening and closing position of the side door D changes to be outside the predetermined range under the door holding control, the motor control unit 122 stops the door holding control. Accordingly, the side door D can be held by the holding force from the electric motor 11 only when the opening and closing position of the side door D is within the predetermined range, and it is possible to provide the user with the same (or similar) operational feeling as that in the case where the check link in the related art is provided when the side door D is opened or closed.

First Example of Holding Force Obtained by Door Holding Control

Figure 13:
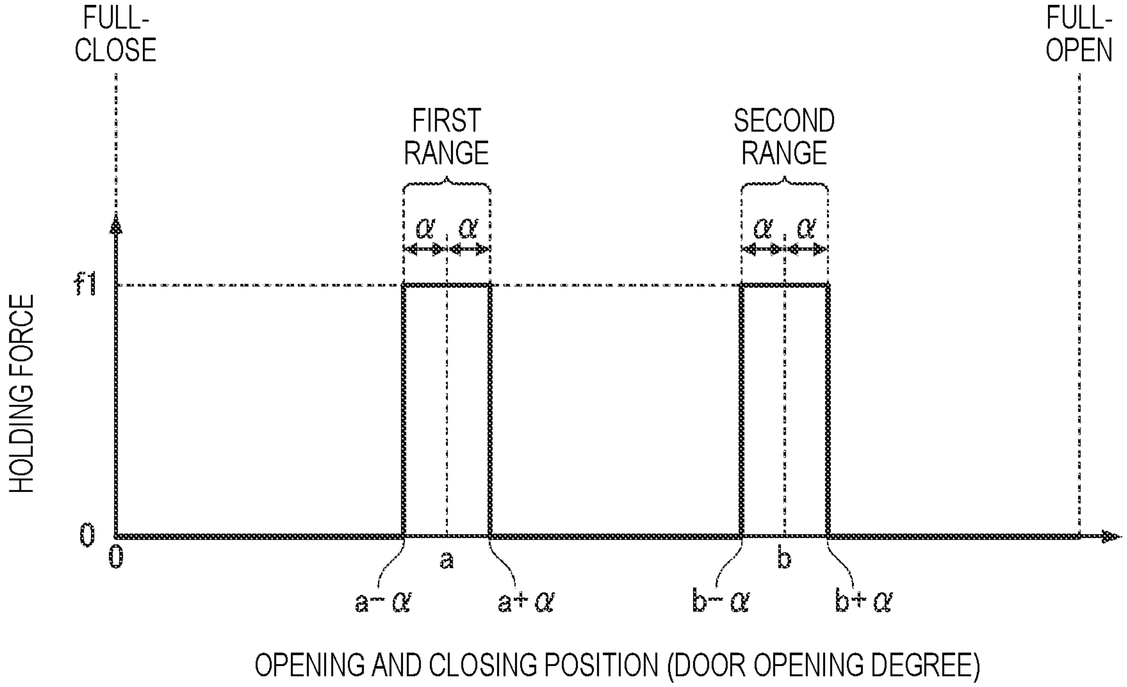
FIG. 13 is a diagram illustrating a first example of a holding force obtained by the door holding control.

Hereinafter, specific examples of the holding force obtained by the door holding control will be described. FIG. 13 is a diagram illustrating a first example of the holding force obtained by the door holding control. In FIG. 13, the vertical axis represents the magnitude of the holding force, and the horizontal axis represents the opening and closing position (in other words, the door opening degree) of the side door D.

As illustrated in FIG. 13, for example, when the opening and closing position of the side door D is within the first range or within the second range (that is, within the predetermined range), the control device 120 (for example, the motor control unit 122) causes the holding force having a substantially constant magnitude (f1 in the example illustrated in FIG. 13) to be generated. In this way, for example, as compared with a case where the holding force is changed as in a second example illustrated in FIG. 14 or a third example illustrated in FIG. 15, it is possible to hold the side door D within the first range or within the second range by the holding force while reducing a processing load of the control device 120. The magnitude of the holding force can be freely determined by a manufacturer of the door opening and closing device 100 or the like.

Second Example of Holding Force Obtained by Door Holding Control

Figure 14:
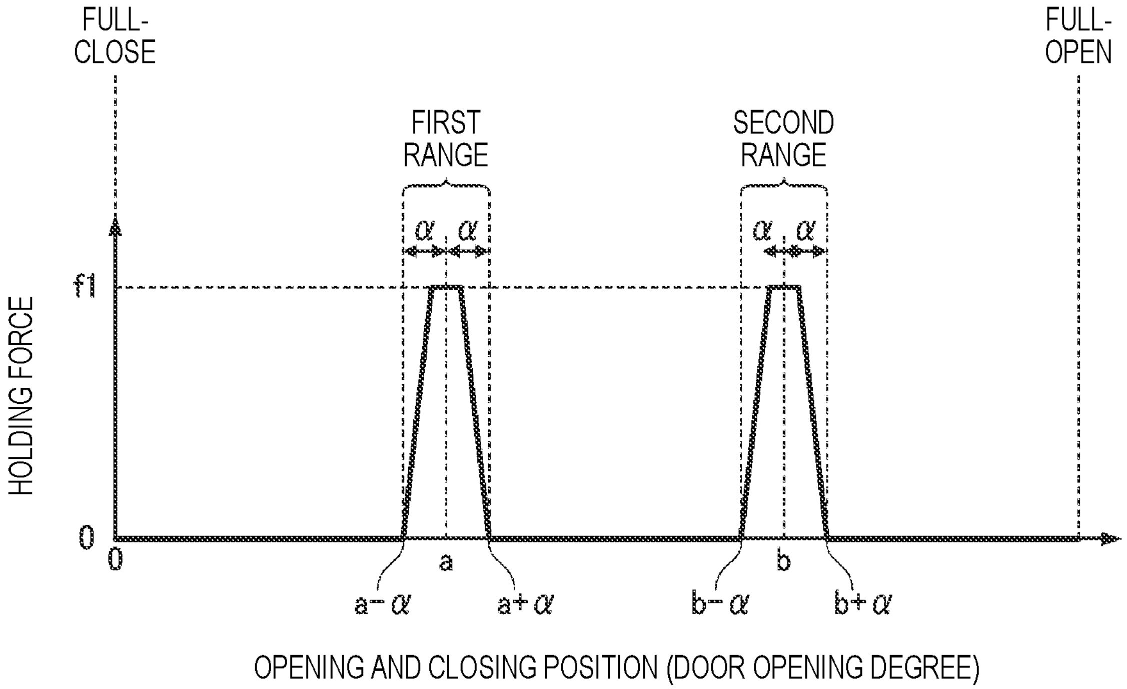
FIG. 14 is a diagram illustrating a second example of the holding force obtained by the door holding control.

In the first example illustrated in FIG. 13, the holding force is constant when the opening and closing position of the side door D is within the first range or within the second range. FIG. 14 is a diagram illustrating the second example of the holding force obtained by the door holding control. Here, points different from the first example illustrated in FIG. 13 will be mainly described, and descriptions of points common to the first example illustrated in FIG. 13 will be omitted or simplified as appropriate.

As illustrated in FIG. 14, when the opening and closing position of the side door Dis within the first range or within the second range (that is, within the predetermined range), the control device 120 (for example, the motor control unit 122) may change the magnitude of the holding force depending on the opening and closing position at that time. In other words, the control device 120 may change the magnitude of the holding force depending on the opening and closing position of the side door D in the door holding control.

More specifically, when the opening and closing position of the side door D is within the first range, the control device 120 may increase the holding force as the opening and closing position is closed to "a" as the predetermined position within the first range, and may decrease the holding force as the opening and opening and closing position is apart away from "a". Similarly, when the opening and closing position of the side door D is within the second range, the control device 120 may increase the holding force as the opening and closing position is closed to "b" as the predetermined position within the second range, and may decrease the holding force as the opening and opening and closing position is apart away from "b".

In this way, it is possible to prevent the holding force from suddenly changing and applying a large impact to the hand of the user who operates the side door D when the opening and closing position of the side door D changes to be within the predetermined range from outside the predetermined range, or when the opening and closing position changes to be outside the predetermined range from within the predetermined range. Therefore, for example, when the side door D is opened or closed, it is possible to provide the user with the same natural operational feeling as that in the case where the check link in the related art is provided in the vehicle, and it is possible that the user opens or closes the side door D without feeling unnatural.

Third Example of Holding Force Obtained by Door Holding Control

Figure 15:
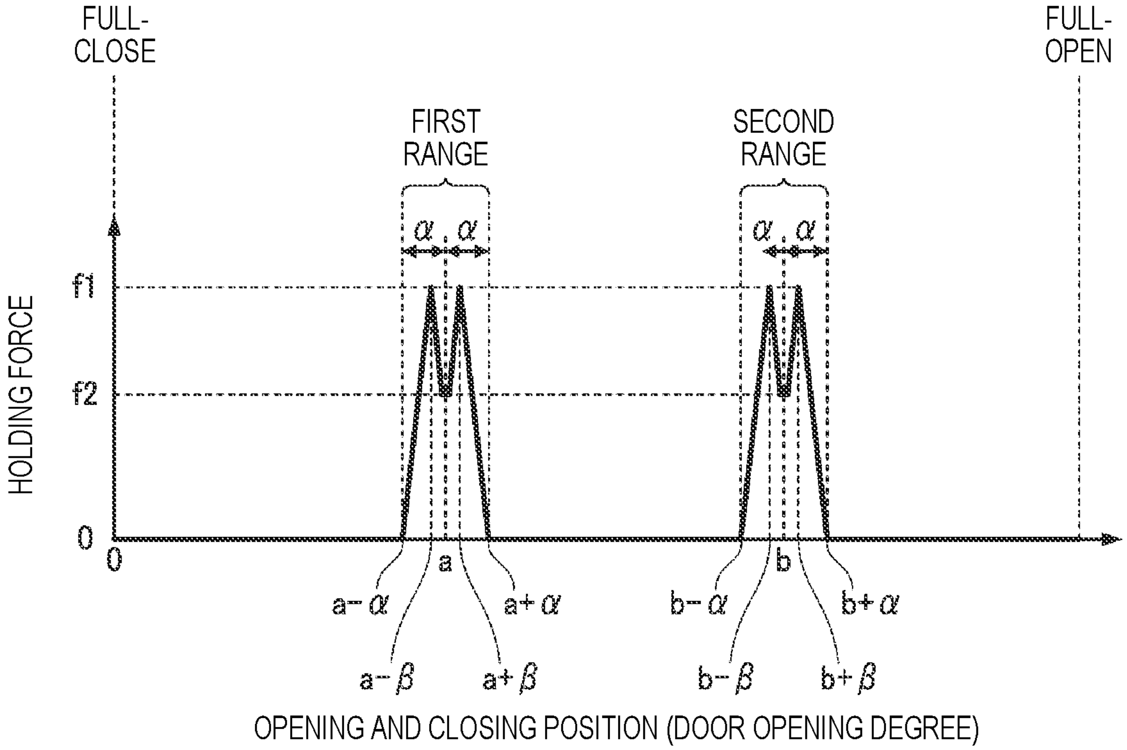
FIG. 15 is a diagram illustrating a third example of the holding force obtained by the door holding control.

FIG. 15 is a diagram illustrating the third example of the holding force obtained by the door holding control. Here, points different from the first example illustrated in FIG. 13 or the second example illustrated in FIG. 14 will be mainly described, and descriptions of points common to the first example illustrated in FIG. 13 or the second example illustrated in FIG. 14 will be omitted or simplified as appropriate.

As illustrated in FIG. 15, the control device 120 (for example, the motor control unit 122) may temporarily decrease the magnitude of the holding force when the opening and closing position of the side door D is within the first range and is near "a" as the predetermined position within the first range.

More specifically, when the opening and closing position of the side door D is within the first range, the control device 120 may gradually increase the holding force to f1 when the opening and closing position is in a range from "a−$\alpha$" to "a−$\beta$" ($\beta<\alpha$), and may gradually decrease the holding force to f2 (f2<f1) when the opening and closing position is in a range from "a−$\beta$" to "a". Further, the control device 120 may gradually increase the holding force to f1 again when the opening and closing position is in a range from "a" to "a+$\beta$", and may gradually decrease the holding force to 0 (zero) when the opening and closing position is in a range from "a+$\beta$" to "a+$\alpha$".

That is, when the opening and closing position of the side door D is within the first range, the control device 120 may decrease the magnitude of the holding force (f2 in the example illustrated in FIG. 15) when the opening and closing position is the predetermined position "a" within the first range to be smaller than a maximum value of the holding force in a case where the opening and closing position is within a range from "a−α" to "a" (f1 in the example illustrated in FIG. 15) and a maximum value of the holding force in a case where the opening and closing position is within a range from "a" to "a+α" (f1 in the example illustrated in FIG. 15).

In this manner, the control device 120 can indicate, through applying the holding force, to the user that the opening and closing position is near "a" by temporarily decrease the magnitude of the holding force when the opening and closing position of the side door D is within the first range and is near "a" as the predetermined position within the first range.

Similarly, the control device 120 may temporarily decrease the magnitude of the holding force when the opening and closing position of the side door D is within the second range and is near "b" as the predetermined position within the second range. More specifically, when the opening and closing position of the side door D is within the second range, the control device 120 may decrease the magnitude of the holding force in a case where the opening and closing position is the predetermined position "b" within the second range to be smaller than a maximum value of the holding force in a case where the opening and closing position is within a range from "b−α" to "b" and a maximum value of the holding force in a case where the opening and closing position is within a range from "b" to "b+α". Accordingly, the control device 120 can indicate, through applying the holding force, to the user that the opening and closing position is near "b".

Although the embodiment of the door opening and closing device according to the present disclosure has been described above, it is needless to say that the present invention is not limited to the embodiment. It is apparent to a person skilled in the art that various modifications or corrections can be conceived within the scope described in the claims, and it is understood that the modifications or corrections naturally fall within the technical scope of the present invention.

For example, the configurations of the drive unit 10 and the electric motor 11 described in the embodiment described above are merely examples, and the drive unit 10 and the electric motor 11 may adopt other configurations.

Further, although in the examples described in the embodiment described above, the door held by the holding force from the electric motor 11 is the side door D, the door is not limited thereto. For example, a motor generating drive power for a rear gate of the vehicle in an opening and closing direction of the rear gate may be provided, and the rear gate may be held by a holding force from the motor.

In the examples described in the embodiment described above, the holding force is generated by energizing the two phases of the electric motor 11 in the door holding control, but the present invention is not limited thereto, for example, the holding force may be generated by energizing the three phases of the electric motor 11.

Further, in the embodiment described above, the range of "a±α" is set as the first range, but the present invention is not limited thereto, for example, a range from "a−α" to "a+β" may be set as the first range. Further, the first range and the second range are not necessarily set to ranges having the same magnitude, for example, the first range may be the range "a±α", and the second range may be a range "b±β".

Further, although two ranges, that is, the first range and the second range are set as the predetermined range in the embodiment described above, the predetermined range may be only the first range, or may be set to three or more ranges.

As described above, according to the present disclosure, it is possible to provide a door opening and closing device that is capable of using a motor, which generates drive power for a door in an opening and closing direction of the door, to hold the door at a predetermined opening and closing position.

In this description and the like, at least the following matters are described. The parentheses indicate the corresponding constituent elements and the like in the embodiment described above as examples, but are not limited thereto.

(1) A door opening and closing device (door opening and closing device 100), including:

- a motor (electric motor 11) configured to generate a drive power for a door (side door D) in an opening and closing direction of the door;
- a door position sensor (door position sensor 111) configured to detect an opening and closing position of the door; and
- a controller (control device 120) configured to control the motor based on the opening and closing position detected by the door position sensor,
- in which the motor includes a stator (stator ST) having at least three-phase coils (coils L1, L2, and L3) and a rotor (rotor RT) provided to be rotatable with respect to the stator, and generates the drive power when the rotor rotates with respect to the stator,
- the controller performs door holding control of generating, as the drive power, a holding force for holding the door at the opening and closing position, in a case where the opening and closing position is within a predetermined range (within the first range or within the second range), and
- in the door holding control, the controller energizes at least two phases of the motor such that rotation of the rotor is braked to generate the holding force.

According to (1), in the case where the opening and closing position of the door is within the predetermined range, it is possible to hold the door due to the holding force generated in the motor. Accordingly, the door can be held at the predetermined opening and closing position by using the motor. Therefore, for example, even when the check link (also referred to as the door checker) in the related art is not provided separately from the motor, it is possible to hold the door at the predetermined opening and closing position and to prevent the opening and closing movement of the door against the intention of the user. In other words, even when the check link in the related art is not provided, it is possible to provide the user with the same (or similar) operational feeling as that in the case where the check link in the related art is provided when the door is opened or closed. Accordingly, it is possible to prevent the increase in the number of parts while improving the convenience for the user as compared with the case where the check link in the related art is also provided in addition to the motor.

(2) The door opening and closing device according to (1),

- in which the controller stops the door holding control when the opening and closing position changes to be outside the predetermined range under the door holding control.

According to (2), the door can be held by the holding force from the motor only when the opening and closing position of the door is within the predetermined range, and it is possible to provide the user with the same (or similar)

operational feeling as that in the case where the check link in the related art is provided when the door is opened or closed.

(3) The door opening and closing device according to (1) or (2), in which the controller performs the door holding control, in a case where an acceleration in the opening and closing direction of the door is less than a predetermined value and the opening and closing position is within the predetermined range, and the controller does not perform the door holding control regardless of the opening and closing position when the acceleration is equal to or larger than the predetermined value.

According to (3), it is possible to prevent the generation of the holding force that can inhibit the opening and closing of the door against the intention of the user that the user is trying to quickly open or close the door.

(4) The door opening and closing device according to any one of (1) to (3), in which the controller energizes two phases corresponding to a rotation position of the rotor with respect to the stator, in a case where the door holding control renders to be in a two-phase energizing state.

According to (4), the intermittent feeling of the movement of the door under the door holding control can be reduced, and the operability of the door under the door holding control can be improved.

(5) The door opening and closing device according to any one of (1) to (4), in which in the door holding control, the controller changes a magnitude of the holding force depending on the opening and closing position.

According to (5), when the door is opened or closed, it is possible to provide the user with the same natural operational feeling as that in the case where the check link in the related art is provided, and it is possible that the user opens or closes the door without feeling unnatural.

(6) The door opening and closing device according to (5), in which the predetermined range is a range from a first position to a second position, and includes a predetermined position between the first position and the second position, and the controller increases the holding force as the opening and closing position is closed to the predetermined position, and decreases the holding force as the opening and closing position is apart away from the predetermined position.

According to (6), it is possible to prevent the holding force from suddenly changing and applying the large impact to the hand of the user who operates the door when the opening and closing position of the door changes to within the predetermined range from outside the predetermined range, or when the opening and closing position changes to outside the predetermined range from within the predetermined range. Therefore, when the door is opened or closed, it is possible to provide the user with the same natural operational feeling as that in the case where the check link in the related art is provided, and it is possible that the user opens or closes the door without feeling unnatural.

(7) The door opening and closing device according to (5), in which the predetermined range is a range from a first position to a second position, and includes a predetermined position between the first position and the second position, and the controller decreases the magnitude of the holding force in a case where the opening and closing position is the predetermined position to be smaller than a maximum value of the holding force in a case where the opening and closing position is within a range from the first position to the predetermined position, and a maximum value of the holding force in a case where the opening and closing position is within a range from the predetermined position to the second position.

According to (7), it is possible to indicate, through applying the holding force, to the user that the opening and closing position is near the predetermined position within the predetermined range.

What is claimed is:

1. A door opening and closing device, comprising:

a motor configured to generate drive power for a door in an opening direction and a closing direction of the door;

a door position sensor configured to detect an opening and closing position of the door; and a controller configured to control the motor based on the opening and closing position detected by the door position sensor, wherein:

the motor comprises a stator comprising at least three-phase coils and a rotor configured to rotate with respect to the stator, and generates the drive power when the rotor rotates with respect to the stator;

the controller is configured to enter a door holding control mode when the door position sensor detects that the opening and closing position of the door lies within a predetermined range, wherein in the door holding control mode, the controller energizes at least two phases of the motor to brake rotation of the rotor and generate a holding force, thereby inhibiting opening and closing of the door;

the controller is configured to enter the door holding control mode, in a case where an acceleration in the opening direction or the closing direction of the door is less than a predetermined value and the opening and closing position of the door lies within the predetermined range, and the controller is configured to not enter the door holding control mode regardless of the opening and closing position of the door when the acceleration is equal to or larger than the predetermined value.

2. The door opening and closing device according to claim 1, wherein the controller is configured to exit the door holding control mode when the opening and closing position of the door lies outside the predetermined range under the door holding control mode.

3. The door opening and closing device according to claim 1, wherein in the door holding control mode, the controller energizes two phases corresponding to a rotation position of the rotor with respect to the stator.

4. The door opening and closing device according to claim 1, wherein the predetermined range is a range from a first position to a second position, and includes a predetermined position between the first position and the second position, and the controller increases the holding force as the opening and closing position of the door lies closer to the predetermined position, and decreases the holding force as the opening and closing position of the door lies apart away from the predetermined position.

5. The door opening and closing device according to claim 1, wherein the predetermined range is a range from a first position to a second position, and includes a predetermined position between the first position and the second position, and the controller decreases the magnitude of the holding force in a case where the opening and closing position is the predetermined position to be smaller than a maximum value of the holding force in a case where the opening and closing position of the door lies within a range from the first position to the predetermined position, and a maximum value of the holding force in a case where the opening and closing position of the door lies within a range from the predetermined position to the second position.

6. A door opening and closing device, comprising:

a motor configured to generate drive power for a door in an opening direction and a closing direction of the door;

a door position sensor configured to detect an opening and closing position of the door; and a controller configured to control the motor based on the opening and closing position detected by the door position sensor, wherein:

the motor comprises a stator comprising at least three-phase coils and a rotor configured to rotate with respect to the stator, and generates the drive power when the rotor rotates with respect to the stator;

the controller is configured to enter a door holding control mode when the door position sensor detects that the opening and closing position of the door lies within a predetermined range, wherein in the door holding control mode, the controller energizes at least two phases of the motor to brake rotation of the rotor and generate a holding force, thereby inhibiting opening and closing of the door;

in the door holding control mode, the controller changes a magnitude of the holding force depending on the opening and closing position of the door;

the predetermined range is a range from a first position to a second position, and includes a predetermined position between the first position and the second position; and the controller increases the holding force as the opening and closing position of the door lies closer to the predetermined position, and decreases the holding force as the opening and closing position of the door lies apart away from the predetermined position.

7. A door opening and closing device, comprising:

a motor configured to generate drive power for a door in an opening direction and a closing direction of the door;

a door position sensor configured to detect an opening and closing position of the door; and a controller configured to control the motor based on the opening and closing position detected by the door position sensor, wherein:

the motor comprises a stator comprising at least three-phase coils and a rotor configured to rotate with respect to the stator, and generates the drive power when the rotor rotates with respect to the stator;

the controller is configured to enter a door holding control mode when the door position sensor detects that the opening and closing position of the door lies within a predetermined range, wherein in the door holding control mode, the controller energizes at least two phases of the motor to brake rotation of the rotor and generate a holding force, thereby inhibiting opening and closing of the door;

in the door holding control mode, the controller changes a magnitude of the holding force depending on the opening and closing position of the door; the predetermined range is a range from a first position to a second position, and includes a predetermined position between the first position and the second position, and the controller decreases the magnitude of the holding force in a case where the opening and closing position is the predetermined position to be smaller than a maximum value of the holding force in a case where the opening and closing position of the door lies within a range from the first position to the predetermined position, and a maximum value of the holding force in a case where the opening and closing position of the door lies within a range from the predetermined position to the second position.

* * * * *